(12) United States Patent
Somers et al.

(10) Patent No.: US 8,910,282 B2
(45) Date of Patent: Dec. 9, 2014

(54) SYSTEM AND METHOD FOR PROTECTING DEVICES ON DYNAMICALLY CONFIGURED NETWORK

(76) Inventors: Jonathan Somers, Ponte Vedra, FL (US); Yasushi Kudo, Marietta, GA (US)

( * ) Notice: Subject to any disclaimer, the term of this patent is extended or adjusted under 35 U.S.C. 154(b) by 0 days.

(21) Appl. No.: 13/603,246

(22) Filed: Sep. 4, 2012

(65) Prior Publication Data

US 2014/0068720 A1 Mar. 6, 2014

(51) Int. Cl.
*H04L 29/06* (2006.01)

(52) U.S. Cl.
USPC .......................................... 726/22

(58) Field of Classification Search
USPC ................ 726/2, 5, 23, 22; 713/162
See application file for complete search history.

(56) References Cited

U.S. PATENT DOCUMENTS

| | | | |
|---|---|---|---|
| 7,096,495 B1 * | 8/2006 | Warrier et al. .................. | 726/15 |
| 7,231,660 B1 | 6/2007 | Daude et al. | |
| 7,734,632 B2 * | 6/2010 | Wang ............................ | 707/749 |
| 7,792,909 B2 * | 9/2010 | Lund et al. ..................... | 709/206 |
| 8,041,785 B2 * | 10/2011 | Mazur et al. .................. | 709/220 |
| 8,189,584 B2 * | 5/2012 | Fernandez Gutierrez .... | 370/390 |
| 8,560,616 B1 * | 10/2013 | Diac et al. ..................... | 709/206 |
| 2005/0071480 A1 | 3/2005 | Chu et al. | |

FOREIGN PATENT DOCUMENTS

| | | |
|---|---|---|
| EP | 1073244 A1 | 1/2001 |
| JP | H11-154978 | 6/1999 |

OTHER PUBLICATIONS

European search report and search opinion dated Mar. 24, 2014 for EP Application No. 13182582.0.
Hassan, et al. Rogue DHCP server detection. IP.Com. IP.Com Inc. West Henrietta, NY, US. Nov. 5, 2009.

\* cited by examiner

*Primary Examiner* — Ali Abyaneh
(74) *Attorney, Agent, or Firm* — Wilson, Sonsini, Goodrich & Rosati

(57) ABSTRACT

Provided herein are systems and methods for implementing a more secure network client device in connection with the dynamic host configuration protocol (DHCP). Incoming DHCP Offer packets containing configuration information are temporarily collected. Once all incoming Offers are judged to have been received, offers are scored and a winning offer is selected. The winning offer is used to configure the device's network stack.

33 Claims, 2 Drawing Sheets

SYSTEM AND METHOD FOR PROTECTING DEVICES ON DYNAMICALLY CONFIGURED NETWORK

BACKGROUND OF THE INVENTION

One of the biggest security vulnerabilities in modern TCP/IP networks is reliance upon Dynamic Host Configuration Protocol, or DHCP. Without DHCP, a computer user attempting to join a network may be required to locate the human network administrator to request an IP address, subnet mask, Domain Name Service (DNS) server address, and other network configuration settings, and the user must manually configure the network stack of the computer to use such settings.

Such a manual approach is often impractical and sometimes impossible, and DHCP may be used instead to configure devices on a network. Using DHCP, a client computer wishing to join a network announces its desire to locate a suitable DHCP server by broadcasting a DHCP Discovery request packet. DHCP servers on the network typically respond with a DHCP Offer packet, which may include the network configuration information for the client, including parameters such as the proposed network address, subnet mask, addresses of additional resources such as gateway routers and DNS servers, and other useful information. The client can then select from among the received offers and respond with a request to Reserve the offered configuration, and the offering DHCP server may finalize the reservation and update its address tables accordingly.

The use of DHCP as described may include certain weaknesses and may have the potential to cause certain security issues within a network. First, there is no provision for limiting which hosts may act as a DHCP server on a given network or subnet, and the DHCP protocol does not offer any means to specify which server is the definitive or even preferred DHCP server for a given network or subnet. As a result, clients receiving offers from two or more DHCP servers must decide for themselves whether a DHCP Server on the network is legitimate and whether any DHCP server on the network may be a security threat. Second, the network stacks in many clients simply accept the first DHCP response offer received since (1) many networks typically have only a single DHCP server, (2) many client devices seek to connect to the network as quickly as possible, and (3) there may often be no way to know in advance how many DHCP servers are present on a network subnet, and therefore how many DHCP offers to expect. Accordingly, many clients make no effort to determine if a DHCP Offer response is received from a legitimate or authorized DHCP server on the network, a DHCP server that has been accidentally inserted into the network or unintentionally configured to provide DHCP service, or a rogue DHCP server potentially operated by a hacker with malicious intent.

For example, a "rogue" DHCP server may be inserted into the public network of a business such as an Internet café by a hacker in order to provide vulnerable configuration information on the network. Upon a client device's request for DHCP information, the hacker's rogue DHCP server may respond to the client prior to a legitimate DHCP server on the network. In some cases, the rogue DHCP server's offer can instruct the client to use insecure or otherwise rogue servers for the client's gateway, DNS server, or for any other network information typically provided by a DHCP server. In this manner, a hacker may direct the client to dangerous network resources, such as counterfeit websites, servers capable of intercepting account names and passwords, and other services that may perform other types of nefarious activity virtually undetectable by the client.

In this example, after a hacker has set up his rogue DHCP server on a network, a customer with a mobile phone could attempt to join the network. When the mobile phone broadcasts a DHCP Discovery request, it may receive DHCP Offer responses from the legitimate router on the network and from the hacker's rogue server. If the hacker's rogue server response is the first received by the customer, then it is likely that mobile phone will configure its network information based on the information supplied by the hacker.

In this example, the hacker's rogue DHCP server may assign the customer a DNS Server address different than the legitimate one on such network. If the mobile phone visits a website of no interest to the hacker, then the hacker's DNS server may forward the request on to the legitimate DNS server, and upon receiving a reply, the customer's mobile device may browse to the requested webpage unaware that anything unusual is taking place.

However, if the mobile phone user decides to visit a specific website targeted by the hacker, then when the mobile phone transmits that domain name in a DNS query, the invalid DNS server configured by the hacker's rogue DHCP server can respond directly with an IP address that may be a counterfeit or "phishing" website. The mobile phone user's web browser will then attempt to load a web page that it believes is coming from a trusted host server on the network or on the public Internet, when in reality the page may be actually coming from a forged website operation by the hacker. If the page is very similar to the actual webpage the user requested, the user may believe that he or she has successfully reached such website when, in fact, it is a potentially dangerous website. By such mechanism, the hacker may be able to perform a variety of dangerous or otherwise insecure actions, such as potentially capturing the user's credentials (such as username and password) as they are entered into the counterfeit web page.

Accordingly, by supplying the winning DHCP Offer from an unauthorized DHCP server, a hacker can direct a victim to virtually any host or server for virtually any purpose. And, by blindly accepting the rogue DHCP Offer response on the network, the customer may accordingly have his or her entire network traffic managed, tracked, and manipulated by any such hacker or other nefarious entity.

Accordingly, there is a need to provide a reliable means of client-side defense against rogue DHCP servers at a network client device.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The present invention relates to systems and methods for improved network security, and more particularly relates to methods and processes for assessing the validity of DHCP Offers. Accordingly, the systems and methods described herein may be used to protect a network client device from exploitation by rogue DHCP servers. Various aspects of the invention described herein may be applied to any of the particular applications set forth below. It shall be understood that different aspects of the invention can be appreciated individually, collectively, or in combination with each other.

Figure 1:
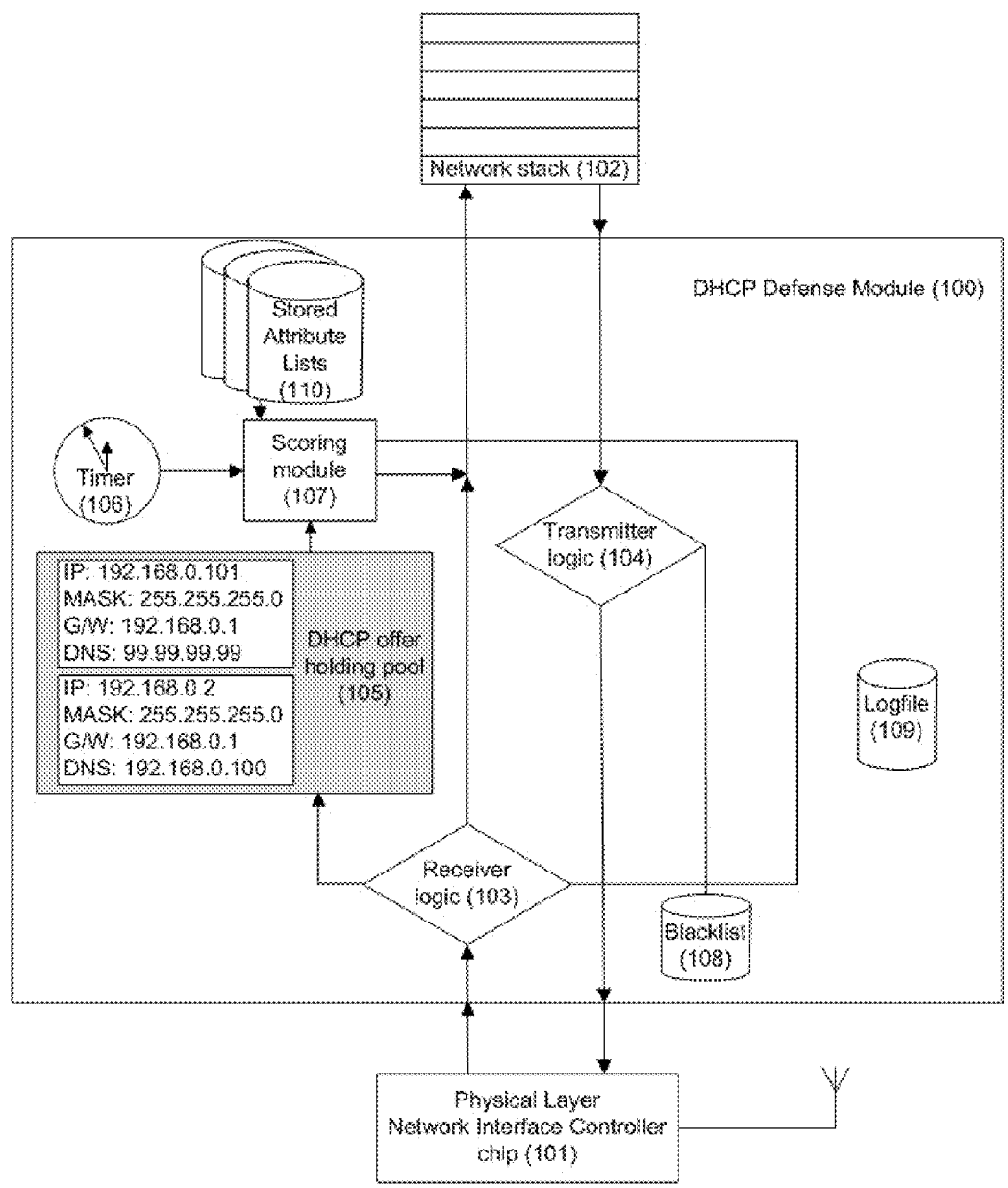
FIG. 1 illustrates a block diagram of a DHCP Defense Module, configurable to implement the systems and methods described herein, according to an embodiment.

Aspects of the invention are addressed to a network client device using the Dynamic Host Configuration Protocol (DHCP). FIG. 1 illustrates a block diagram of a DHCP Defense Module (100) incorporated into a network client device that may be configurable to implement the systems and methods described herein, according to an embodiment. The network client device referenced herein may include any network-connected devices capable of being configured for such network connectivity through the use of DHCP, such as mobile, cellular, or "Smart" phones (e.g., iPhone, BlackBerry, Android, Treo); a wireless device such as a wireless email device; certain network client devices such as a tablet; personal digital assistants (PDAs) such as a Palm-based device or Windows CE device; any other type of mobile device that may communicate over a network and handle electronic transactions; any personal computer such as a laptop, desktop, or netbook; any network servers; or any other devices capable of communicating with a computer network or other communication network. The devices may also include network hardware equipment, including intermediary or other network control devices, such as a network server, router or switch capable of being configured to implement the methods and systems described herein. Any discussion herein of devices or clients may also be applied to any other such devices as provided.

The network client device referenced herein may have a processor and a memory that may store an operating system (OS) and an implementation of a network stack. It shall be understood that the memory of a network client device may include non-removable memory or removable memory. The non-removable memory may consist of RAM, ROM, a hard disk, or other well-known memory storage technologies. The removable memory may consist of Subscriber Identity Module (SIM) cards, which are well known in GSM communication systems, or other well-known memory storage technologies, such as "smart cards" or flash memory-based memory.

The network client device may include a network stack (102) that may operate to process network packet requests and responses sent from and received by the network client device. It shall be understood that the network stack (102) of the network client device may implement either the IPv4 or the IPv6 protocol, or both, and that the present invention may be constructed to defend against rogue DHCP servers using either the IPv4 or the IPv6 protocol, or both. It shall further be understood that, while in some embodiments the DHCP Defense Module may not directly implement the DHCP protocol or provide the direct functionality of DHCP, it does attempt to distinguish potentially legitimate DHCP Offers from potentially illegitimate DHCP Offers.

In some embodiments, the systems and methods described herein may be implemented as a "shim" between the physical layer (101) and logical layer of the network stack (102). In some embodiments, the DHCP Defense Module (100) may be integrated into the network stack software or into the OS, instead of a discrete module. In some embodiments, the DHCP Defense Module (100) may be integrated into a firewall, intrusion detection system, intrusion prevention system, or similar security product, as one feature or component of that product. In some embodiments, the DHCP Defense Module (100) may be implemented in hardware, either discretely from or directly incorporated into one or more Network Interface Controllers (NICs) within the client device. Other embodiments are also possible.

In one aspect of the current invention, incoming packets may be examined and classified for further processing by a receiver logic module (103). The packets may be intercepted in network traffic by a receiver logic module (103) and examined for DHCP packets in both inbound and outbound directions between the logical layer of network stack (102) and physical layer (101).

For example, incoming packets from physical layer (101) may pass thru one or more receiver logic modules (103) to determine whether the packet is an IP packet, whether it is a UDP packet, whether it is addressed to the protected device, whether it is a DHCP Offer packet, whether it is a duplicate of an offer already received, and whether the source of the packet has been blacklisted. In some embodiments, if the inbound packet is not a DHCP Offer for the protected device, it is forwarded to network stack (102) for normal processing. In some embodiments, if the inbound packet is a DHCP Offer for the protected device, it is placed into a temporary holding pool (105).

Since a network client device may not know in advance how many DHCP servers are present on a network, the network client device does not know how many offers to expect either. Also, because of varying network conditions, the length of time required to receive an offer is not known. This makes it difficult to judge whether all eligible offers have arrived. According to an embodiment, the transmission by a protected device of an initial DHCP Discovery packet starts a timer (106). Timer (106) may be set to expire after a fixed interval, or it can be set to operate for an interval dictated by a configuration. For example, the timer may be controllable by the user or may be controllable by a central management and service bureau (230) associated with a respective ecosystem (200). Offers that arrive while timer (106) is running may be placed in holding pool (105). In one embodiment, when the timer expires, the complete set of offers is judged to have arrived and the scoring process begins.

In some embodiments, a reloadable timer may be used for timer (106). The timer is started when the initial DHCP Discovery packet is transmitted, as above. Again, the timer may be a fixed value or it may be a configurable value, as above. Each time a DHCP Offer packet is received, if the timer has not yet expired, then the timer is reset to its initial value. When a reloadable timer expires without an additional offer being received, the complete set of eligible offers may be judged to have been received.

In some embodiments, transmitter logic (104) may prevent a protected device from transmitting any additional DHCP Discovery requests if timer (106) is active. In this manner, the DHCP Defense Module (100) may help prevent duplicate DHCP Offer responses from being received.

Once all DHCP offers are judged to have been received and collected in holding pool (105), a scoring module (107) evaluates each offer and assigns a score based on various attributes of the offers and/or the locations from which they originated. DHCP Defense Module (100) then selects a winning offer from the scored DHCP Offers and forwards the winning offer to the network stack for normal processing. In some embodiments, all DHCP offers other than the winning offer may be ignored and silently dropped, and holding pool (105) may be emptied. The network stack may then act upon the winning offer as if it had been the only offer, and client device network configuration will complete in accordance with standard DHCP procedures.

According to an embodiment, scoring module (107) may assign a numerical score to each DHCP Offer based on one or more attributes of the DHCP Offer. In some embodiments, each attribute utilized as part of the scoring calculation may be scored independently, and each attribute may further have a weight assigned to its importance in the scoring algorithm. For example, scoring module (107) may calculate a score for each received DHCP Offer based on an algorithm that takes into account one or more of the following characteristics associated with such offer: client IP Address, subnet mask, DHCP server IP address, DHCP server MAC address, the presence and/or value of an Organizationally Unique Identifier ("OUI") in the DHCP server MAC address, one or more DNS server IP addresses, or network gateway IP address. In such case, for example, scoring module (107) may give a higher weight to the score associated with the DHCP server IP address while giving a lower weight in the algorithm to the score associated with the client IP Address. Accordingly, the scoring module (107) may first calculate scores for each attribute that is being considered and then add the scores together based on each attribute's assigned weight in the formula. The final aggregated weighted score is then associated with the DHCP Offer. The scoring module (107) will perform similar calculations for all received DHCP Offers. In some embodiments, the attributes associated with the DHCP Offer may be further cross-checked against a list of acceptable or unacceptable attributes for a DHCP Server, such as may be available in one or more stored attribute lists (110).

In some embodiments, the scoring module (107) may score and weight one or more specific attributes of a DHCP Offer according to the likelihood that such attribute identifies a potentially trusted source. For example, the scoring module (107) may be able to determine whether an OUI exists within the Layer 2 MAC address for the source of a DHCP Offer, and may choose to provide a higher score to DHCP Offers associated with a valid OUI. In some embodiments, the DHCP Defense Module (100) may be able to identify or extract an identifier of a specific manufacturer or other similar information from an OUI. Accordingly, the scoring module (107) may provide a higher or lower score for the OUI attribute depending on whether a manufacturer is identifiable and/or whether an identified manufacturer is considered a trusted source from which a valid DHCP Offer maybe validly transmitted. For example, if the OUI of a particular DHCP Offer is known to be assigned to a trustworthy manufacturer of network equipment, the associated DHCP Offer's score with respect to the OUI attribute may be higher, since it is more likely that a valid DHCP Offer would be received from such network equipment than if an offer is received from a mobile device.

In an embodiment, the DHCP Offer may be scored based on attributes associated with the network configuration information contained in the DHCP Offer. For example, a DHCP Offer may be scored based on whether the gateway address of the network contained in the network configuration information is not equal to any IP Address of DNS servers on the network. In some networks, the DNS server for a network is not typically the access point responsible for routing network packets, and the existence of such a characteristic may indicate potential malicious intent. In some embodiments, a DHCP Offer may be scored lower if only a single DNS server address is provided in the associated network configuration information, indicating another potential malicious environment.

In some embodiments, DHCP Defense Module (100) may be configured to utilize one or more stored attribute lists (110), which stored attribute lists (110) may maintain certain attribute values associated with DHCP Offers. In some embodiments, the one or more stored attribute lists (110) may include a list of approved or permitted attribute values and/or may include a list of rejected or insecure attribute values. According to an embodiment, a stored attribute list (110) may be configured for a single specific type of attribute and may provide a listing of permitted values for such attribute only. Similarly, a stored attribute list (110) may be configured to store a listing of restricted, insecure, or otherwise untrustworthy values for a specific attribute type. In some embodiments, the scoring module (107) may assign a higher or lower score to a particular attribute based on whether the attribute value exists, respectively, in a stored attribute list representing trustworthy sources or exists in a stored attribute list representing untrustworthy sources.

For example, the DHCP Defense Module may utilize a stored attribute list (110) that includes a listing of acceptable, permitted or otherwise trustworthy OUIs and may further maintain a stored attribute list (110) that includes a listing of untrustworthy OUIs. In some embodiments, a DHCP Offer may be eligible for selection as the winning offer only if its associated OUI is present in one or more trustworthy stored attribute lists (110). For example, the OUI of a DHCP Offer may be required to be present on a stored attribute list of likely trustworthy manufacturing sources, such as a list of known router and access point vendors, or else may not be permitted to be selected as a winning offer. As further example, scoring module (107) may assign a higher or lower score to a DHCP Offer based on whether its OUI is found in either a trustworthy or untrustworthy stored attribute list (110), but may also permit such DHCP Offer to be selected as a winning offer even if the associated OUI is not found in any stored attribute list. In some embodiments, the OUI attribute is one of a number of attributes that may be stored in one or more stored attribute lists (110) and available to be weighed when scoring a DHCP Offer for ranking purposes.

It should be understood that a stored attribute list (110) may be stored in the memory of the network device or may be read from a configuration file or other persistent medium. The stored attribute list (110) may be capable of being updated by external means such as a service bureau (230) associated with a respective ecosystem (200), according to an embodiment.

In some embodiments, the selection of a winning DHCP Offer from multiple received DHCP Offers may involve selecting a non-optimal "winning" offer. For example, if a protected device always chooses the winning offer according to fixed scoring rules, then over time, hackers may be able to deduce what such rules are, and devise appropriate strategies for defeating them. Further, in cases such as corporate networks where a rogue DHCP server has been set up inadvertently, then it is possible that a rogue DHCP server offer may score higher than a legitimate server offer in certain scenarios.

In some embodiments, the Scoring module (107) may select the winning offer from among the received offers by not simply choosing the highest-scoring offer, but instead selecting randomly from among the received offers. In some embodiments, the scoring module (107) may implement a random proportional selection approach such that the odds of a given offer's selection may be proportional to its score from the scoring module (107). For example, suppose that a protected device receives two offers—offer A, with a score of 8, and offer B, with a score of 24. It may be advantageous to select the winner randomly, with offer A having a probability of 8/(8+24) or a 0.25 probability of being chosen, and offer B having a 0.75 probability of being chosen.

This provides several benefits. First, by adding a level of unpredictability to the selection process, it becomes more difficult for hackers to study the behavior of devices protected by the present invention in order to deduce their mechanisms, scoring weights, and so on. Second, no matter how much reverse engineering of code, studying of network traffic, or other study a hacker does, he cannot guarantee that any particular set of offer attributes is guaranteed to win. Third, if the protected devices in an ecosystem (200) do not all behave identically in a given situation, then the different results obtained from the random selections can be compared at a service bureau (230) using forensic techniques (such as studying the DHCP offers and the network packets immediately following the DHCP process). These forensic results can be used to improve the weighting factors for the offer attributes, to assign new offer attributes for analysis, and to develop entirely new defenses against DHCP hijacks as well as other types of attacks. It shall be understood that this approach provides a number of additional benefits beyond those exemplary benefits listed above.

Figure 2:
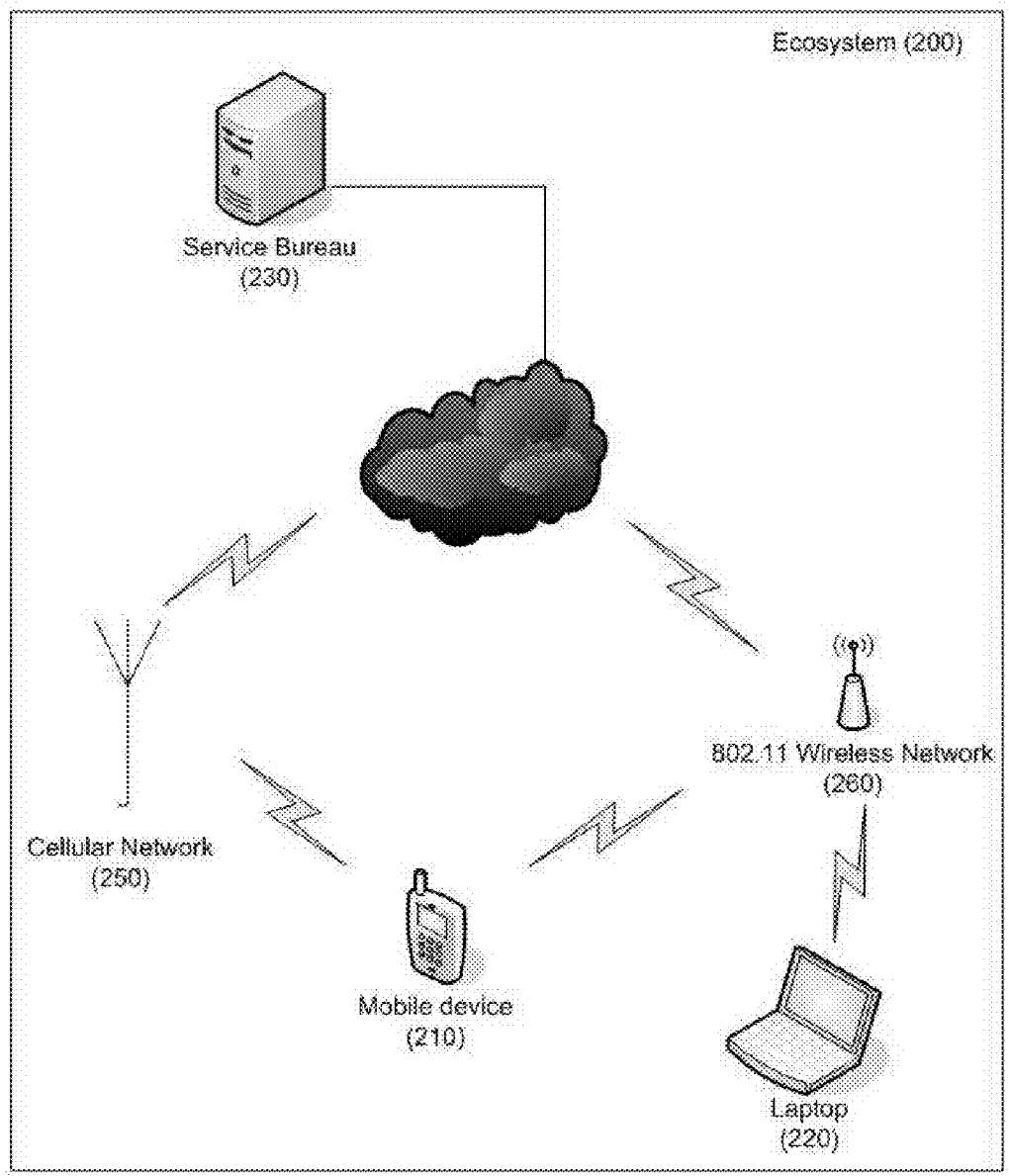
FIG. 2 is a block diagram illustrating an ecosystem capable of supporting protected devices configured according to the systems and methods described herein, according to an embodiment.

FIG. 2 is a block diagram illustrating an ecosystem (200) configured to support protected devices configured according to the systems and methods described herein, according to an embodiment. Ecosystem (200) may include one or more centralized service bureaus (230) capable of providing certain management, configuration and/or aggregation services. In some embodiments, ecosystem (200) may only cover a single discrete network. In some embodiments, the ecosystem (200) encompassing such protected devices may span multiple networks, such that a protected device may be able to roam from one network to another network while remaining within the same ecosystem (200). In some embodiments, a protected device may simultaneously participate in multiple networks as part of the same ecosystem (200). For example, mobile device (210) configured as described herein may be connected to both cellular network (250) and 802.11 wireless network (260), and mobile device (210) may participate in the ecosystem (200) through service bureau (230) as described herein through each such network connection.

In some embodiments, an ecosystem (200) may encompass networks in which only some devices participating on such network are configured to implement the systems and methods described herein. For example, 802.11 wireless network (260) may include laptop (220) that is not configured for security protection as described herein and does not participate in ecosystem (200), and may also contain mobile device (210) that is configured for security protection as described herein and participates in ecosystem (200). In some embodiments, the network client devices referenced herein may implement the systems and methods described herein without any connection to an ecosystem.

In some embodiments, protected devices in an ecosystem (200) may be configured to implement similar or identical scoring methodologies. For example, in some embodiments, all protected devices in ecosystem (200) may be configured to implement random proportional selection of DHCP Offers. In some embodiments, a random selection of protected devices in ecosystem (200) may be configured to implement random proportional selection of DHCP Offers or devices may implement random proportional selection only periodically. For example, for a given protected device, perhaps one out of every five cases of receiving multiple offers will use random proportional selection, and four out of every five cases will use deterministic selection based on the highest score. According to an embodiment, the choice of which devices must use random proportional selection may be configurable through a service bureau (230).

In some embodiments, when the winning offer has been selected, in addition to dropping all losing offers, the source of each losing offer may also be added to a blacklist (108) by transmitter logic module (104). Blacklist (108) serves to protect the network client device from other types of attacks not necessarily related to DHCP. Once the source of a DHCP Offer has been determined to be a hostile source, it may be the case that other types of traffic from the same source are also likely to be hostile.

In some embodiments, insertion of multiple DHCP Offer packets to the holding pool (105) may trigger the recording of these offers and all related network packets into a log file (109). Log file (109) can be periodically collected and analyzed by a management entity, such as the service bureau (230) of an ecosystem (200), for analysis, so as to improve the parameters which govern the behavior of the scoring and other modules, and thereby provide improved security.

Log file (109) may be used to record various types of information for later collection and use. For example, log records of noteworthy events and actions may be recorded to the log file (109), such as the scoring module (107) determining that multiple competing offers have been received (indicating that a DHCP hijack may have been attempted) or such as the scoring module (107) selecting a particular offer and dropping another offer. In some embodiments, the events and actions may be logged along with information about the scores received by each. Log records of specific network activity may also be recorded to the log file (109), either in whole or in part. For example, if multiple DHCP offers are received, the actual IP packets for each offer may be recorded, either in part or in their entirety. In some embodiments, the entire IP packets for each DHCP offer may be recorded in log file (109), and if additional packets are received from a network host whose offer has been dropped, then those network packets might be recorded in part. This may be useful in the case where a hacker attempts to hijack a victim via DHCP, but after failing to do so, may attempt other attacks on the victim; by recording portions of subsequent packets, it may be possible to determine what that hacker's next steps are likely to be in similar situations.

In an embodiment, the log file (109) may be an actual file on the persistent file storage system of the target device, such as flash memory, a magnetic storage drive, an SD or MMC card, or some similar type of persistent storage. In another embodiment, the log file (109) may be a buffer of volatile memory on the device, such as static or dynamic memory. In another embodiment, the log file (109) may not be an actual file in the traditional sense, but simply a block of memory which forms the payload area of a network packet, such that the entire log file (109) may be transmitted by simply completing the corresponding network header fields, checksums, etc, and transmitting the packet to a central service bureau (230) with no other intermediate form of storage.

According to some embodiments, the contents of the log file (109) may be periodically retrieved from the network device by a centralized service bureau (230). For example, when the log file (109) approaches a certain size, or a percentage of its maximum or designated capacity, or crosses some similar threshold, the protected device may push the contents of the log file (109) to a centralized service bureau (230). In another embodiment, when an event deemed sufficiently critical has occurred, such as the receipt of multiple DHCP offers suggesting an attack, or a certain number of occurrences of such attacks, then the protected device may push the contents of the log file (109) to a centralized service bureau (230).

In some embodiments, the protected device may elect to defer communicating information to a centralized service bureau (230), such as, for example, if it appears that a hostile machine may be present on the current network. In such case, the protected device may defer communications until the device has roamed from the potentially compromised network to another, safer network. If the protected device can participate on multiple networks—for example, a wireless local-area network and a cellular wide-area network—then when the protected device detects an attack attempt on one network, it may elect to contact a centralized service bureau (230) on another network, if available.

In some embodiments, the user of the client device may be notified of potential hostile DHCP Offers or may participate in the selection of a winning DHCP Offer. For example, in the case that multiple DHCP Offer packets are received in the holding pool (105), the user of the network device may be notified through one or more user interfaces of the device, such as a display, speaker, and/or vibrator attached to the device. In this manner, the user may be advised of potentially hostile network activity, as well as may be afforded an opportunity to decline joining the network. In some embodiments, the network client device may provide, by means of a user interface, the multiple DHCP offers to the user of the device for his choice, and may further allow the user to manually select from among the received DHCP offers.

It shall be understood that the systems and methods described herein may be useful for numerous application within a network security infrastructure or ecosystem (200). For example, when devices protected by the present invention transmit one or more log files (109) to a centralized service bureau (230), they effectively form an ecosystem (200) of protected devices that communicate with such centralized service bureau (230). Their participation with the centralized service bureau (230) may effectively improve the defense capabilities of all participants. As further example, by obtaining the log files (109) from many protected devices, a centralized service bureau (230) may analyze the scores assigned under a wide variety of network conditions, and thus determine whether other scoring parameters or weights would result in more effective protection of all participating protected devices.

Many DHCP servers may be extensively configured by network administrators. In some cases, there may be legitimate DHCP servers which also provide DNS services to their network clients, and may list only a single DNS server address as part of the DHCP offer. In connection with some embodiments of a scoring module, such servers may score relatively poorly compared to other legitimate DHCP servers, and may still be easy for a hacker to beat. However, other attributes of such servers (for example, the range of IP addresses issued, their own IP address, or their response times) may be used to improve the scores of such DHCP offers as calculated hereby. By adjusting the weights of a scored attribute, a service bureau (230) implementation may improve the odds of selecting such servers as legitimate servers and rejecting hackers competing against such legitimate servers. In such a manner, when these adjusted weights are distributed to all of the protected devices in the ecosystem (200), the entire ecosystem (200) may benefit.

In another example, if a service bureau (230) discovers that all of the offers from legitimate DHCP servers by a particular manufacturer also provide a single self-assigned DNS server address, but that the same manufacturer's MAC addresses contain a valid OUI, then such an OUI may be added to the internal list of accepted OUIs, thereby improving that device's relative score. In some embodiments, such a list maintained by a service bureau (230) may then be distributed to all devices in the ecosystem (200), thereby providing stronger protection to the entire ecosystem (200) based on a communal use of the preferable invention.

The methods described herein may further provide value in certain forensic analysis of network traffic that may, for example, be capable of being performed at a service bureau (230) level. For example, when a potential attack is detected, the contents of subsequent network packets, or portions thereof, may be recorded to the log file (109) for later analysis. When one or more log files (109) from many devices are collected at the service bureau (230) and analyzed, either manually or using automated tools, or a combination of both, patterns of network behavior may become apparent. For example, it could be discovered that offers from attempted DHCP hijacks contain common elements or patterns, such as OUIs indicating that the offers always originate from a particular make and/or model of device. Or, it could be discovered that a number of offers for attempted hijacks were made on a particular date and in a particular time range in a specific geographic area, or on a particular type of network (such as the free Wi-Fi networks offered in a chain of retail stores operated by a particular retailer). Such forensic information may be invaluable in locating and identifying hackers for, for example, law enforcement officials, as well as in devising improved defenses against both DHCP hijacks as well as other types of attacks.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method for providing security to a network client device, comprising:
   receiving, by the network client device, one or more DHCP Offer responses to a request for network configuration information;
   determining, by the network client device, a score associated with each DHCP Offer response of the one or more DHCP Offer responses, the score indicative of trustworthiness of the DHCP Offer response, wherein determining the score associated with each DHCP Offer response comprises assigning a first score for the DHCP Offer response based on an attribute included in the DHCP Offer response related to a DHCP server address and assigning a second, lower score for the DHCP Offer response based an attribute included in the DHCP Offer response related to a client IP address, and wherein the trustworthiness of the DHCP Offer response indicates a likelihood that the DHCP Offer response originates from a trusted source;

selecting, by the network client device, a DHCP Offer response from the one or more DHCP Offer responses based at least in part on the scores respectively associated with the one or more DHCP Offer responses; and configuring the network client device according to the selected DHCP Offer response.

2. The method of claim 1, wherein the receiving of one or more DHCP Offer responses involves receiving and storing each received response for a configurable period of time.

3. The method of claim 2, wherein the receiving of one or more DHCP Offer responses is based on a resettable timer.

4. The method of claim 1, wherein the network configuration information comprises information provided by a DHCP server, including one or more of a client IP Address, subnet mask, DHCP server IP address, DHCP server MAC address, one or more DNS server IP addresses, or network gateway IP address.

5. The method of claim 1, wherein determining the score associated with each DHCP Offer response is based in whole or in part on one or more attributes embedded in or associated with each DHCP Offer response.

6. The method of claim 5, wherein the one or more attributes embedded in or associated with each DHCP Offer response are one or more of the following: client IP Address, subnet mask, DHCP server IP address, DHCP server MAC address, the presence and/or value of an OUI in the DHCP server MAC address, one or more DNS server IP addresses, or network gateway IP address.

7. The method of claim 1, wherein determining the score associated with each DHCP Offer response is based on one or more attributes associated with a DHCP server associated with each DHCP Offer response.

8. The method of claim 7, wherein determining the score associated with each DHCP Offer response comprises the scoring an attribute based on whether an attribute value associated with the attribute exists in a stored attribute list.

9. The method of claim 1, wherein determining the score associated with each DHCP Offer response is based in whole or in part on an order of receipt of the DHCP Offer responses.

10. The method of claim 1, wherein determining the score associated with each DHCP Offer response is based on whole or in part on the elapsed time between the transmission of the request for network configuration information and the receipt of the DHCP Offer response.

11. The method of claim 1, wherein the selected DHCP Offer response is the DHCP Offer response with the highest score.

12. The method of claim 1, wherein the selected DHCP Offer response is selected at random from the one or more DHCP Offer responses based on a weighted random selection.

13. The method of claim 1 wherein configuring the network client device comprises supplying the selected DHCP Offer response to a network stack of the network client device.

14. The method of claim 1, wherein determining the score associated with each DHCP Offer response comprises assigning a first score to the DHCP Offer response if a network gateway IP address included in the DHCP Offer response is equal to any IP address of DNS servers on the network and assigning a second, lower score to the DHCP Offer response if the IP addresses is not equal to any IP address of DNS servers on the network.

15. The method of claim 1, wherein determining the score associated with each DHCP Offer response comprises assigning a score to each attribute in the DHCP Offer response and aggregating the scores to determine the score for the DHCP Offer response.

16. The method of claim 15, wherein assigning the score to each attribute of the DHCP Offer response comprises cross-checking the attribute against a list of acceptable attributes for a DHCP server, assign a first score to the attribute if the attribute is in the list and assigning a second, lower score for the DCP Offer response if the attribute is not found in the list.

17. The method of claim 15, wherein assigning the score to each attribute of the DHCP Offer response comprises cross-checking the attribute against a list of unacceptable attributes for a DHCP server, assigning a first score to the attribute if the attribute is in the list and assigning a second, higher score to the attribute if the attribute is not found in the list.

18. The method of claim 1, wherein determining the score associated with each DHCP Offer response comprises assigning a first score for the DHCP Offer response if the DHCP Offer response includes a valid Organizationally Unique Identifier ("OUI") and assigning a second, lower score for the DHCP Offer response if the DHCP Offer response does not include a valid OUI.

19. A system for implementing security to a network client device, comprising:

a processor;

a memory coupled to the processor, wherein the memory comprises program instructions executable by the processor for:

receiving, by the network client device, one or more DHCP Offer responses to a request for network configuration information;

determining, by the network client device, a score associated with each DHCP Offer response of the one or more DHCP Offer responses, the score indicative of trustworthiness of the DHCP Offer response, wherein determining the score associated with each DHCP Offer response comprises assigning a first score for the DHCP Offer response based on an attribute included in the DHCP Offer response related to a DHCP server address and assigning a second, lower score for the DHCP Offer response based an attribute included in the DHCP Offer response related to a client IP address, and wherein the trustworthiness of the DHCP Offer response indicates a likelihood that the DHCP Offer response originates from a trusted source;

selecting, by the network client device, a DHCP Offer response from the one or more DHCP Offer responses based at least in part on the scores respectively associated with the one or more DHCP Offer responses; and configuring the network client device according to the selected DHCP Offer response.

20. The system of claim 19, wherein the receiving of one or more DHCP Offer responses involves receiving and storing each received response for a configurable period of time.

21. The system of claim 20, wherein the receiving of one or more DHCP Offer responses is based on a resettable timer.

22. The system of claim 19, wherein the network configuration information comprises information provided by a DHCP server, including one or more of a client IP Address, subnet mask, DHCP server IP address, DHCP server MAC address, one or more DNS server IP addresses, or network gateway IP address.

23. The method of claim 19, wherein determining the score associated with each DHCP Offer response is based in whole or in part on one or more attributes embedded in or associated with each DHCP Offer response.

24. The system of claim 23, wherein the one or more attributes embedded in or associated with each DHCP Offer response are one or more of the following: client IP Address, subnet mask, DHCP server IP address, DHCP server MAC address, the presence and/or value of an OUI in the DHCP server MAC address, one or more DNS server IP addresses, or network gateway IP address.

25. The system of claim 19, wherein determining the score associated with each DHCP Offer response is based on one or more attributes associated with a DHCP server associated with each DHCP Offer response.

26. The system of claim 25, wherein determining the score associated with each DHCP Offer response comprises scoring an attribute based on whether an attribute value associated with the attribute exists in a stored attribute list.

27. The system of claim 19, wherein determining the score associated with each DHCP Offer response is based in whole or in part on an order of receipt of the DHCP Offer responses.

28. The system of claim 19, wherein determining the score associated with each DHCP Offer response is based on whole or in part on the elapsed time between the transmission of the request for network configuration information and the receipt of the DHCP Offer response.

29. The system of claim 19, wherein the selected DHCP Offer response is the DHCP Offer response with the highest score.

30. The system of claim 19, wherein the selected DHCP Offer response is selected at random from the one or more DHCP Offer responses based on a weighted random selection.

31. The system of claim 15, wherein determining the score associated with each DHCP Offer response comprises assigning a first score for the DHCP Offer response if an Internet Protocol (IP) address included in the DHCP Offer response is within a range of known DHCP server IP addresses and assigning a second, lower score for the DHCP Offer response if the IP address is outside the range of known DHCP server IP addresses.

32. The system of claim 19, wherein determining the score associated with each DHCP Offer response comprises assigning a first score for the DHCP Offer response if the DHCP Offer response includes a valid Organizationally Unique Identifier ("OUI") and assigning a second, lower score for the DHCP Offer response if the DHCP Offer response does not include a valid OUI.

33. The method of claim 19 wherein configuring the network client device comprises supplying the selected DHCP Offer response to a network stack of the network client device.

* * * * *

UNITED STATES PATENT AND TRADEMARK OFFICE
CERTIFICATE OF CORRECTION

| | | |
|---|---|---|
| PATENT NO. | : 8,910,282 B2 | Page 1 of 1 |
| APPLICATION NO. | : 13/603246 | |
| DATED | : December 9, 2014 | |
| INVENTOR(S) | : Jonathan Somers et al. | |

It is certified that error appears in the above-identified patent and that said Letters Patent is hereby corrected as shown below:

Title Page, item (73) Assignee: Please insert a paragraph (73) Assignee to read as follows:

--(73) Assignee: Arxceo Corporation, Atlanta, (GA)--

Signed and Sealed this
Thirteenth Day of October, 2015

Michelle K. Lee
*Director of the United States Patent and Trademark Office*

UNITED STATES PATENT AND TRADEMARK OFFICE
CERTIFICATE OF CORRECTION

PATENT NO. : 8,910,282 B2  
APPLICATION NO. : 13/603246  
DATED : December 9, 2014  
INVENTOR(S) : Jonathan Somers et al.

Page 1 of 1

It is certified that error appears in the above-identified patent and that said Letters Patent is hereby corrected as shown below:

On the Title Page

Item (76) should read----Item (75)

<u>Item (73) Assignee</u>: Please insert a paragraph (73) Assignee to read as follows:

--(73) Assignee: Arxceo Corporation, Atlanta, (GA)--

This certificate supersedes the Certificate of Correction issued October 13, 2015.

Signed and Sealed this  
Tenth Day of November, 2015

Michelle K. Lee  
*Director of the United States Patent and Trademark Office*